(12) United States Patent
Jan et al.

(10) Patent No.: US 7,125,431 B2
(45) Date of Patent: Oct. 24, 2006

(54) METHOD FOR ADHESION OF WOUND ELECTRODES OR ELECTRODE LAMINATION FOR USE IN A LITHIUM-ION SECONDARY BATTERY

(75) Inventors: Yih-Song Jan, Hsinchu Hsien (TW); Sheng-Feng Wu, Hsinchu Hsien (TW); Chang-Rung Yang, Hsinchu Hsien (TW); Yu-Min Peng, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 334 days.

(21) Appl. No.: 10/316,522

(22) Filed: Dec. 10, 2002

(65) Prior Publication Data

US 2003/0113442 A1    Jun. 19, 2003

(30) Foreign Application Priority Data

Dec. 18, 2001    (TW) .............................. 90131302 A

(51) Int. Cl.
- *H01M 6/00* (2006.01)
- *H01M 4/00* (2006.01)
- *H01M 6/16* (2006.01)
- *H01M 4/58* (2006.01)

(52) U.S. Cl. .................. 29/623.4; 29/623.3; 29/623.5; 429/94; 429/324; 429/231.96

(58) Field of Classification Search .................. 429/94, 429/137, 174, 185, 324, 231.95; 29/623.2, 29/623.3, 623.4, 623.5
See application file for complete search history.

(56) References Cited

U.S. PATENT DOCUMENTS

| | | | | |
|---|---|---|---|---|
| 2,430,933 A * | 11/1947 | Hoover | ........................ | 428/174 |
| 4,137,379 A * | 1/1979 | Schmidt et al. | .............. | 429/254 |
| 4,279,978 A * | 7/1981 | Dodin et al. | ................. | 429/248 |
| 5,470,357 A | 11/1995 | Schmutz et al. | ............ | 29/623.5 |
| 5,538,826 A * | 7/1996 | Ainoya et al. | .............. | 430/59.6 |
| 5,723,231 A | 3/1998 | Wu et al. | .................... | 429/203 |
| 5,741,609 A * | 4/1998 | Chen et al. | .................. | 429/307 |
| 5,851,504 A * | 12/1998 | Barker et al. | ............. | 423/447.2 |
| 6,207,326 B1 * | 3/2001 | Kawakami et al. | .... | 429/231.95 |
| 6,225,010 B1 * | 5/2001 | Hamano et al. | ............. | 429/306 |
| 6,255,010 B1 * | 7/2001 | George et al. | ................. | 429/30 |
| 6,280,873 B1 * | 8/2001 | Tsukamoto | ................... | 429/94 |
| 6,364,916 B1 * | 4/2002 | Andrieu et al. | ............. | 29/623.3 |
| 6,423,447 B1 * | 7/2002 | Ohsaki et al. | ............... | 429/217 |
| 6,579,649 B1 * | 6/2003 | Tsutsue et al. | .............. | 429/309 |
| 6,864,118 B1 * | 3/2005 | Stasiak | ........................ | 438/99 |

FOREIGN PATENT DOCUMENTS

EP    0 933 824    8/1999

* cited by examiner

*Primary Examiner*—Patrick Joseph Ryan
*Assistant Examiner*—Thomas H. Parsons
(74) *Attorney, Agent, or Firm*—Merchant & Gould P.C.

(57) ABSTRACT

A method for adhesion of wound electrodes or electrode lamination for use in a lithium-ion secondary battery, comprising acts of dissolving a polymer applied on electrode sheets in a selected solvent; applying the solvent containing polymer on surfaces of the electrode sheets; and vaporizing the solvent by heating to laminate electrode sheets together is disclosed.

6 Claims, 2 Drawing Sheets

METHOD FOR ADHESION OF WOUND ELECTRODES OR ELECTRODE LAMINATION FOR USE IN A LITHIUM-ION SECONDARY BATTERY

BACKGROUND OF THE INVENTION

1. Field of the Invention

The present invention relates to a method for adhesion of electrodes, and more particularly to a method for adhesion of electrodes used on a lithium-ion secondary battery in which the method is convenient to apply on lithium-ion battery manufacturing process and improves the electrical capacitance of the battery.

2. Description of Related Art

Lithium-ion secondary batteries are widely applied to notebook computers, cell-phones, video-cameras, digital cameras, and other portable electrical products. As per the function improvement of these electrical products, the lithium-ion secondary battery is demanded to possess excellent capacitance but be minimized in size and weight.

The lithium-ion secondary battery in the early stage is made of the following acts of sandwiching two layers of isolation membranes between a positive electrode sheet and a negative electrode sheet; concentrically winding the laminated electrodes sheets with the isolation membranes to an electrode roll; inserting the electrode roll into a metal shell and pouring electrolyte solution into the metal shell; then sealing the metal shell to achieve the lithium-ion secondary battery.

Since the electrode roll has a volume with multiple vacant spaces inside the metal shell to reduce the capacitance, the electrode is piled up to an electrode block to reduce space-wasting inside the metal shell and to increase capacitance density (capacitance/volume(or weight)) of the battery. However, the technique of the electrode block is not matured enough to meet contemporary practice.

With regard to the metal shell, manufacturers use an aluminum shell to reduce the total weight of the battery because aluminum is lighter than other metals, but the aluminum shell is not sufficiently rigid to avoid deforming and easily causes damage of the electrode roll or electrode block inside the aluminum shell. Therefore, strongly laminating the electrode sheets and isolation layers is important. When the electrode sheets separate with the isolation layers, the charging and discharging characteristics of the battery are not stable and that seriously diminishes the lifetime of the battery. With regard to the electrode roll, achieving sufficient lamination of the electrodes sheets and the isolation layers is determined by an intensity of pulling force when winding. When the intensity of the pulling force is strong, the lamination of the electrode sheets and the isolation layers is excellent. However, strong pulling force easily causes breakage to the electrode sheets. Additionally, a redundant vacant space is left at center of the electrode roll after taking out a winding rod when the winding process is finished. Even when the electrode roll is squeezed in vacuum circumstance into the aluminum shell, the vacant space is still left to cause loss of capacitance density of the battery. With regard to the electrode block, because the electrodes sheets need polymer adhesive to stick with the isolation layers, the polymer adhesive makes the conductivity of the electrode sheet reduced.

There are three prior patents related to the present invention shown as following:

1. In granted EP933,824 patent, the method discloses the isolation layers are coated with adhesive or polymer adhesive to be laminated with the electrode sheets. However, the method of evenly coating adhesives on each isolation layers is complex and difficult to be carried out.

2. U.S. Pat. No. 5,723,231 discloses an electrolyte mixed of $H_3PO_4$ and a polymer such as poly-benzimidazole within a ratio range. The mixed electrolyte further contains forged silica oxide to increase adhesive efficiency of the mixed electrolyte to electrode sheets. However, sufficient lamination between the electrode sheets and the isolation layers still can not be achieved.

3. U.S. Pat. No. 5,470,357 discloses an electrolyte made of copolymer of vinylidene fluoride and hexafluoropropylene mixed with organic plasticizer applied on the electrode sheets to form an electrolyte membrane. Then, all the electrode sheets are laminated to compose a single battery. Lastly, a plurality of single batteries are combined together to form a lithium-ion secondary battery. Therefore, the producing process in 357' patent is complex and only suitable to be applied on an electrode block.

To overcome the shortcomings, the present invention provides a method for adhesion of wound electrodes or electrode lamination for use in a lithium-ion secondary battery to mitigate or obviate the aforementioned problems.

SUMMARY OF THE INVENTION

The main objective of the invention is to provide a method for adhesion of wound electrodes or electrode lamination for use in a lithium-ion secondary battery, which makes electrode sheets laminated sufficiently to increase capacitance of the battery and make the battery durable.

Objectives, advantages and novel features of the invention will become more apparent from the following detailed description when taken in conjunction with the accompanying drawings.

DETAILED DESCRIPTION OF PREFERRED EMBODIMENT

Figure 1:
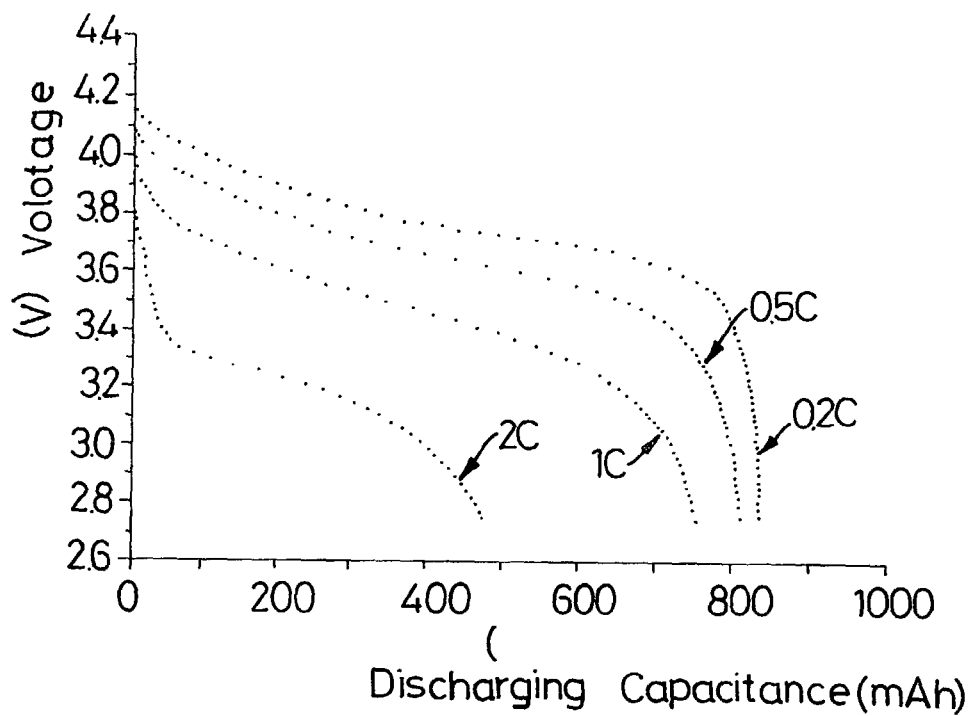
FIG. 1 is a graph of voltages of a lithium-ion secondary battery at different discharging capacitance, wherein the lithium-ion secondary battery is made in example 2 in accordance with the present invention.

A method for adhesion of wound electrodes or electrode lamination for use in lithium-ion secondary battery comprises acts of: dissolving a polymer applied on electrode sheets in a selected solvent; applying the solvent containing polymer on surface of the electrode sheets; and vaporizing the solvent by heating to laminate electrode sheets together.

In examples of this invention, polycarbonate Z-type (PCZ) is preferred to be the polymer applied to the electrode sheet and dichloromethane ($CH_2Cl_2$) is preferred to be the solvent to dissolve the PCZ because the dichloromethane has low boiling point.

First, the PCZ is dissolved in dichloromethane solvent at room temperature without stirring to obtain a transparent solution. In the preferred embodiment, the solution can be stirred to make the PCZ dissolve in the solvent quickly. Then, the solution is applied on positive or negative electrode sheets (containing wound electrodes or electrode laminate) by painting, screen printing, or similar methods to coat the electrode sheets with the solution. Then, an isolation layer is sandwiched between the positive and negative electrode sheets and attached with the positive and negative electrodes together to form a laminated electrode. The laminated electrode is wound up to constitute an electrode roll or is piled up to constitute an electrode block, and then the electrode roll or electrode block is heated in a vacuum dryer to make the electrode sheets and the isolation layer sufficiently laminate together, wherein a heating temperature range in the vacuum dryer is 50~100° C. Because the boiling point of dichloromethane is 40° C. lower than the heating temperature range of the vacuum dryer, the dichloromethane is vaporized to leave PCZ polymer as web patterns on the electrode sheets to cohere with the adjacent isolation layer, whereby the electrode sheets are firmly and evenly laminated on the isolation layer. Hereafter, the electrode roll or electrode block is accommodated inside a metal shell and an electrolyte solution is poured into the metal shell. Lastly, the metal shell is sealed to achieve a lithium-ion secondary battery. The electrolyte solution is selected from a group of LiPF6, LiClO4, LiBF4, or other similar compounds. The electrolyte further contains at least two compositions selected from group comprising ethyl carbonate (EC), diethyl carbonate (DEC), propyl carbonate (PC), dimethylcarbinol (DMC), or vinyl chroloride (VC).

Additionally, the solvent is preferred to be an admixture of dichloromethane ($CH_2Cl_2$) solution mixed with at least one additive selected from the group of EC, PC, and DEC. The admixture is also applied to the electrodes sheets and the dichloromethane is vaporized in a vacuum dryer by heating. However, the at least one additive in the admixture is left and merges with the PCZ to make the PCZ remain as planar membrane after the dichloromethane is vaporized. Therefore, the PCZ membrane sufficiently laminates the electrode sheet to the isolation layer.

In this invention, vaporization of the dichloromethane causes a porous polymer membrane, which laminates the electrode sheet and adjacent isolation layer together. The porous polymer membrane makes lithium-ion transport freely in the electrolyte to contact with the electrodes to increase efficiency of the battery. Additionally, the additives in the admixture do not interfere with the lithium-ion transportation in the electrolyte.

It is noticed that the method in the present invention discloses not only PCZ polymer, but also other polymers such as polyvinylidene difluoride (PVDF), polyvinylidene difluoride/hexafluoropropylene (HFP) copolymer, biphenol A-biphenol polycarbonate (BPPC) copolymer and polyamide when a proper solvent is obtained. For example, a mixed solvent of acetone and tetrahydrofuran is suitable to PVDF/HFP copolymer. Tetrahydrofuran solvent is suitable to dissolve BPPC. Methanol solvent is suitable to dissolve polyamide.

Preferred embodiments in accordance with the present invention are shown in following examples:

EXAMPLE 1

3 g PCZ was dissolved in 60 g dichloromethane to form a polymer solution. The polymer was applied on surfaces of the electrode sheets and dried at 50° C. in vacuum circumstance for 20 min after combining with an isolation layer. The electrode sheets were sufficiently laminated with the isolation layer to compose a laminated electrode when the dichloromethane was vaporized in the drying process. Then, the laminated electrode was inserted into a metal shell and 1M LiPF6 electrolyte was poured into the metal shell. Lastly, the metal shell was sealed to achieve a lithium-ion secondary battery. The battery was tested at 1 KHz and showed a high resistance of 2KΩ, therefore, the discharging efficiency of the battery was poor. However, the laminated electrode was not separated after the test and PCZ polymer is stable to the electrolyte to cause no reaction.

EXAMPLE 2

3 g PCZ was dissolved in an admixture solvent of 48 g dichloromethane and 12 g DEC to form a polymer solution. The polymer is applied on surfaces of the electrode sheets and dried at 50° C. in vacuum circumstance for 1 hr after combining with an isolation layer. The electrode sheets sufficiently laminated with the isolation layer to compose a laminated electrode when the dichloromethane was vaporized in the drying process. Then, the laminated electrode was inserted into a metal shell and 1M LiPF6 electrolyte was poured into the metal shell. Lastly, the metal shell was sealed to achieve a lithium-ion secondary battery. The battery was tested at 1 KHz and showed a resistance of 46 mΩ, as shown in FIG. 1. The laminated electrode was not separated after the test and PCZ polymer is stable to the electrolyte to cause no reaction.

EXAMPLE 3

2 g PCZ was dissolved in an admixture of 55 g dichloromethane and 5 g DEC to form a polymer solution. The polymer is applied on surfaces of the electrode sheets and dried at 70° C. in vacuum circumstance for 1 hr after combining with an isolation layer. The electrode sheets were sufficiently laminate with the isolation layer to compose a laminated electrode when the dichloromethane was vaporized in the drying process. Then, the laminated electrode was inserted into a metal shell and 1M LiPF6 electrolyte was poured into the metal shell. Lastly, the metal shell was sealed to achieve a lithium-ion secondary battery. The battery was tested at 1 KHz and showed a resistance of 42 mΩ. The laminated electrode was not separated after the test.

EXAMPLE 4

Figure 2:
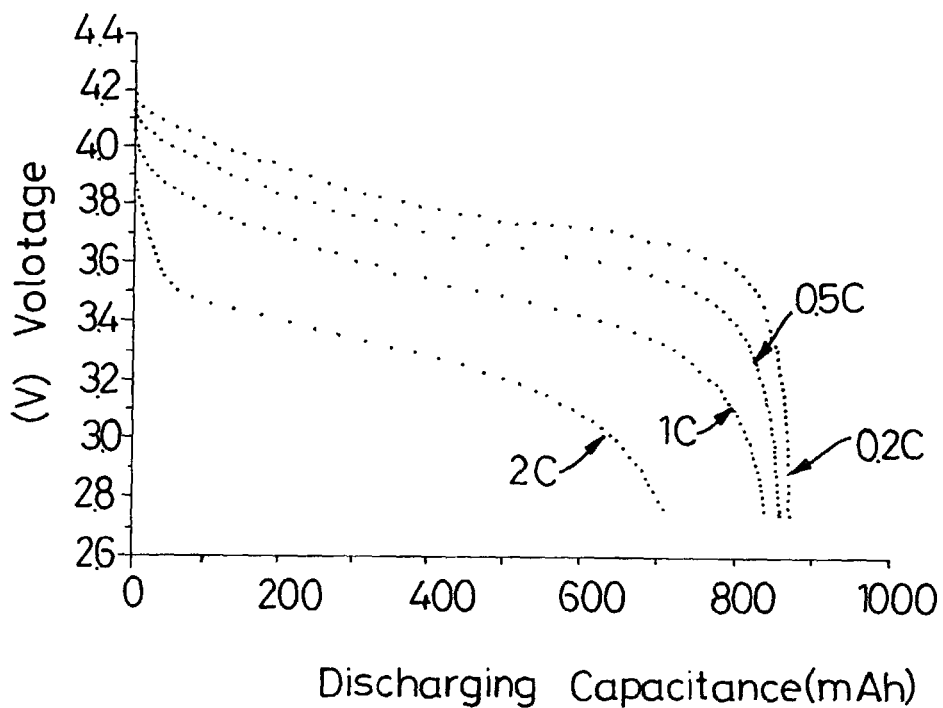
FIG. 2 is a graph of voltages of a lithium-ion secondary battery at different discharging capacitance, wherein the lithium-ion secondary battery is made in example 4 in accordance with the present invention.

1.5 g PCZ was dissolved in an admixture solvent of 55 g dichloromethane and 5 g DEC to form a polymer solution. The polymer is applied on surfaces of the electrode sheets and dried at 70° C. in vacuum circumstance for 1 hr after combining with an isolation layer. The electrode sheets were sufficiently laminated with the isolation layer to compose a laminated electrode when the dichloromethane was vaporized in the drying process. Then, the laminated electrode was inserted into a metal shell and 1 M LiPF6 electrolyte was poured into the metal shell. The electrolyte further contained additives in a volume ratio of EC:DEC:PC=3:5:2. Lastly, the metal shell was sealed to achieve a lithium-ion secondary battery. The battery was tested at 1 KHz and showed resistance of 39 mΩ FIG. 2. Although the PCZ polymer is decreased, the laminated electrode was not separated after the test and PCZ polymer is stable to the electrolyte to cause no chemical reaction.

EXAMPLE 5

1.5 g PCZ was dissolved in an admixture solvent of 55 g dichloromethane and 5 g DEC to form a polymer solution. The polymer is applied on surfaces of the electrode sheets and dried at 70° C. in vacuum circumstance for 1 hr after combining with an isolation layer. The electrode sheets were sufficiently laminated with the isolation layer to compose a laminated electrode when the dichloromethane was vaporized in the drying process. Then, the laminated electrode was inserted into a metal shell and 1M LiBF6 electrolyte was poured into the metal shell. The electrolyte further contained additives in a volume ratio of EC:DMC:PC=2:1:1. Lastly, the metal shell was sealed to achieve a lithium-ion secondary battery. The battery was tested at 1 KHz and showed resistance of 42 mΩ. The PCZ polymer was separated out from the solvent when the dichloromethane was vaporized to form the polymer membrane to laminate the electrode sheets and isolation layer together. The laminated electrode was not separated after the test, even compositions of the electrolyte and the solvent were changed.

EXAMPLE 6

20 g PVDF/HFP copolymer was dissolved in an admixture solvent of 20 g acetone and 5 g THF to form a polymer solution. The polymer is applied on surfaces of the electrode sheets and dried at 40° C. in vacuum circumstance for 30 min after combining with an isolation layer. The electrode sheets were sufficiently laminated with isolation layer to compose a laminated electrode when the acetone was vaporized in the drying process. Then, the laminated electrode was inserted into a metal shell and 1M LiPF6 electrolyte was poured into the metal shell. Lastly, the metal shell was sealed to achieve a lithium-ion secondary battery. The battery was tested at 1 KHz and showed a resistance of 56 mΩ. The laminated electrode was not separated after the test.

EXAMPLE 7

12 g PCZ was dissolved in an admixture solvent of 200 g dichloromethane and DEC to form a polymer solution. Electrodes sheets were dipped into the polymer solution to coat a polymer membrane on surfaces. The electrode sheets sandwiched an isolation layer to compose a laminated electrode. Then, the laminated electrode was dried in a vacuum for 10 min, and continuously dried by heating at 50° C. in vacuum circumstance for 1 hr. The electrode sheets were sufficiently laminated with an isolation layer to compose a laminated electrode when the dichloromethane was vaporized in the drying process. Then, the laminated electrode was inserted into a metal shell and 1M LiPF6 electrolyte was poured into the metal shell. Lastly, the metal shell was sealed to achieve a lithium-ion secondary battery.

EXAMPLE 8

10 g PCZ was dissolved in an admixture solvent of 220 g dichloromethane and 15 g DEC to form a polymer solution. Electrode sheets were dipped into the polymer solution to coat a polymer membrane on surfaces. The electrode sheets were sandwiched in an isolation layer to compose a laminated electrode. Then, the laminated electrode was roughly dried in vacuum for 10 minutes, and continuously dried by heating at 100° C. in vacuum circumstance for 2 hrs. The electrode sheets were sufficiently laminated with an isolation layer to compose a laminated electrode when the dichloromethane vaporized in the drying process. Then, the laminated electrode was inserted into a metal shell and electrolyte described in example 4 was poured into the metal shell. Lastly, the metal shell was sealed to achieve a lithium-ion secondary battery.

EXAMPLE 9

Figure 3:
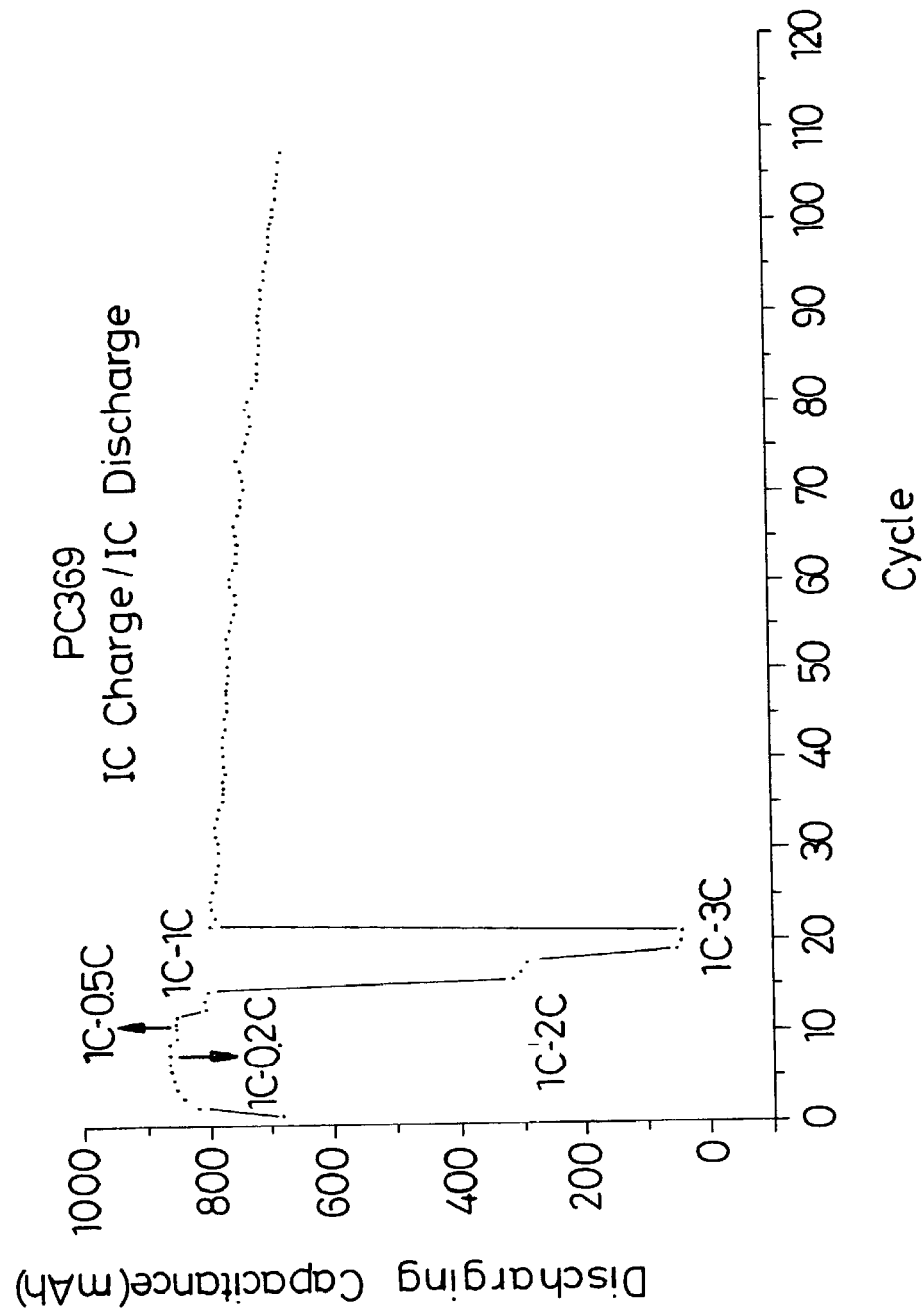
FIG. 3 is a graph of cycles of a lithium-ion secondary battery at different discharging capacitance, wherein the lithium-ion secondary battery is made in example 9 in accordance with the present invention.

2 PCZ was dissolved in an 80 g THF solvent to form a polymer solution. Electrode sheets were dipped into the polymer solution to coat a polymer membrane on surfaces. The electrode sheets sandwiched an isolation layer to compose a laminated electrode. Then, the laminated electrode was dried in a vacuum for 10 minutes, and continuously dried by heating at 70° C. in vacuum circumstance for 1 hr. The electrode sheets were sufficiently laminated with isolation layer to compose a laminated electrode when the dichloromethane was vaporized in the drying process. Then, the laminated electrode was inserted into a metal shell and 1M LiPF6 electrolyte was poured into the metal shell. Lastly, the metal shell was sealed to achieve a lithium-ion secondary battery. The electrolyte further contained additives in volume ration of EC:DEC:PC=3:5:2. The battery was tested at different discharging capacitances to show cycles of the battery and result of the test is shown in FIG. 3.

EXAMPLE 10

2 g polyamide was dissolved in 80 g THF solvent to form a polymer solution. Electrode sheets were dipped into the polymer solution to coat a polymer membrane on surfaces. The electrode sheets sandwiched an isolation layer to compose a laminated electrode. Then, the laminated electrode was dried in a vacuum for 10 minutes, and continuously dried by heating at 70° C. in vacuum circumstance for 1 hr. The electrode sheets were sufficiently laminated with isolation layer to compose a laminated electrode when the dichloromethane vaporized in the drying process. Then, the laminated electrode was inserted into a metal shell and 1M LiPF6 electrolyte was poured into the metal shell. Lastly, the metal shell was sealed to achieve a lithium-ion secondary battery. The electrolyte further contained additives in volume ratio of EC:DEC:PC=3:5:2.

EXAMPLE 11

3 g polyamide was dissolved in 80 g dichloromethane solvent to form a polymer solution. The polymer solution was applied to electrode sheets. The electrode sheets sandwiched an isolation layer to compose a laminated electrode and then dried at 60° C. in vacuum circumstance for 1 hr. The electrode sheets were sufficiently laminated with isolation layer when the dichloromethane vaporized in the drying process. Then, the laminated electrode was inserted into a metal shell and 1M LiPF6 electrolyte was poured into the metal shell. Lastly, the metal shell was sealed to achieve a lithium-ion secondary battery.

EXAMPLE 12

3 g PBBC was dissolved in 70 g THF solvent to form a polymer solution. The polymer is applied to the electrode sheets by painting or screen printing. Then, the electrode sheets sandwiched an isolation layer to compose a laminated electrode and dried at 80° C. in vacuum circumstance for 2 hrs. The electrode sheets were sufficiently laminated with an isolation layer when the THF vaporized in the drying process. Then, the laminated electrode was inserted into a metal shell and 1M LiPF6 electrolyte was poured into the metal shell. Lastly, the metal shell was sealed to achieve a lithium-ion secondary battery.

According to the foregoing description of embodiments in accordance with the present invention. It is easily understood that the electrode sheets are sufficiently laminated with the isolation layer to compose a durable laminated electrode for use in lithium-ion secondary battery. Whereby, the lithium-ion secondary battery has excellent capacitance and discharging efficiency. The method of the present invention is conveniently applicable to all present processes for manufacturing lithium-ion secondary batteries.

Even though numerous advantages of the present invention have been set forth in the foregoing description, the disclosure is illustrative only. Changes may be made in detail within the principles of the invention to the full extent indicated by the broad general meaning of the terms in which the appended claims are expressed.

What is claimed is:

1. A method for adhesion of wound electrodes or electrode lamination for use in a lithium-ion secondary battery, the method comprising the:
   (a) coating a polymer solution selected from the group of polymers consisting of:
      (i) a Z-type polycarbonate in a solvent selected from the group of dichloromethane, ethyl carbonate, propyl carbonate, diethyl carbonate and mixtures thereof;
      (ii) vinylidene bifluoride/hexafluoroproylene copolymer in an admixture of acetone and tetrahydrofuran;
      (iii) diphenol A-diphenol carbonate copolymer in tetrahydrofuran; and
      (iv) polyamide in methanol on surfaces of positive and negative electrode sheets forming adhesive surfaces on the sheets;
   (b) forming a laminated electrode by sandwiching an isolation layer between the coated surfaces of the electrode sheets; and
   (c) vaporizing the solvent to separate the polymer to cohere the electrode sheets with the isolation layer whereby the electrode sheets are firmly and evenly laminated on the isolation layer.

2. The method as claimed in claim 1, wherein the polymer solution is applied on the surfaces of the electrode sheets by dipping the electrode sheets into the polymer solution.

3. The method as claimed in claim 1, wherein the polymer solution is applied on the surfaces of the electrode sheets by painting.

4. The method as claimed in claim 1, wherein the polymer solution is applied on the surfaces of the electrode sheets by screen printing.

5. A lithium-ion secondary battery, comprising a laminated electrode made by the method claimed in claim 1 and an electrolyte containing at least one component selected from a group consisting of $LiPF_6$, $LiBF_4$ and $LiClO_4$.

6. The lithium-ion secondary battery as claimed in claim 5, wherein the electrolyte further contains at least two additives selected from a group consisting of ethyl carbonate (EC), diethyl carbonate (DEC), propyl carbonate (PC), dimethylcarbinol (DMC), or vinyl chloride (VC).

* * * * *